United States Patent
Yasuoka

[19]

[11] Patent Number: 5,979,396
[45] Date of Patent: Nov. 9, 1999

[54] EGR CONTROL SYSTEM FOR ENGINE

[75] Inventor: Masayuki Yasuoka, Yokohama, Japan

[73] Assignee: Nissan Motor Co., Ltd., Yokohama, Japan

[21] Appl. No.: 09/092,858

[22] Filed: Jun. 8, 1998

[30] Foreign Application Priority Data

Jun. 9, 1997 [JP] Japan .................................. 9-151346

[51] Int. Cl.⁶ .................................................. F02B 17/00
[52] U.S. Cl. ........................................ 123/295; 123/430
[58] Field of Search .................................. 123/295, 430, 123/568.21, 568.26

[56] References Cited

U.S. PATENT DOCUMENTS

| | | | |
|---|---|---|---|
| 5,322,043 | 6/1994 | Shriner et al. | 123/295 |
| 5,749,334 | 5/1998 | Oda et al. | 123/305 |
| 5,848,580 | 12/1998 | Mashiki | 123/295 |

FOREIGN PATENT DOCUMENTS

| | | |
|---|---|---|
| 59-37236 | 2/1984 | Japan . |
| 7-269416 | 10/1995 | Japan . |
| 8-189405 | 7/1996 | Japan . |

*Primary Examiner*—John Kwon
*Attorney, Agent, or Firm*—Foley & Lardner

[57] ABSTRACT

An engine control system for an internal combustion engine of a type having a stratified combustion mode and a homogeneous combustion mode comprises a controller for controlling an EGR flow in the engine with an EGR control valve. The controller effects a changeover of an EGR control mode of the EGR control valve from a first EGR mode to a second EGR mode immediately in response to a changeover request signal before an actual changeover of a combustion control mode from the stratified combustion mode to the homogeneous combustion mode. In the case of a changeover from the homogeneous mode to the stratified mode, the controller effects a changeover of the EGR control mode from the second EGR mode to the first EGR mode in response to an actual changeover of the combustion control mode, with a delay after the changeover request signal.

21 Claims, 10 Drawing Sheets

HOMOGENEOUS STOICHIOMETRIC

STRATIFIED LEAN 5,979,396

EGR CONTROL SYSTEM FOR ENGINE

The contents of a Japanese Patent Application No. 9-151346 with a filing date of Jun. 9, 1997 in Japan are hereby incorporated by reference.

BACKGROUND OF THE INVENTION

1. Field of the Invention

The present invention relates to a control system for an internal combustion engine, and more specifically to a control system for controlling an EGR (exhaust gas recirculation) system of an engine of a type having a stratified charge combustion mode and a homogeneous charge combustion mode.

2. Description of Related Art

Recently, the technique of in-cylinder direct fuel injection in a spark ignition engine such as gasoline engine is under development to improve the fuel efficiency and emission performance by using stratified charge combustion and homogeneous charge combustion.

In a low and medium load region, a control system for such a type operates an engine in a stratified combustion mode by injecting fuel directly into a combustion chamber during the compression stroke so as to produce a stratified combustible mixture only around the spark plug. The thus-achieved stratified combustion enables stable combustion with an ultra lean mixture, and hence significant improvement in the fuel efficiency and emission performance of the engine.

In a high load region over a predetermined engine load, the engine is operated in a homogeneous combustion mode to meet a demand for higher output torque. In the homogeneous combustion mode, fuel is injected during the intake stroke so as to produce a homogeneous air fuel mixture. (In some examples, a fuel injection valve is provided separately in an intake port.)

The control system changes over the combustion control mode between the stratified combustion mode and the homogeneous combustion in accordance with one or more engine operating conditions.

To reduce NOx emission, an engine for a vehicle is generally equipped with an EGR system for recirculating part of the exhaust gases from the exhaust system to the intake system. A desired target EGR rate is not equal between stratified combustion and homogeneous combustion. Therefore, there is a need for switching the target EGR rate in accordance with a changeover of the combustion.

Japanese Patent Provisional (Kokai) Publication No. 7(1995)-269416 shows an EGR control system for an engine having stratified combustion and homogeneous combustion. In the stratified combustion, this system determines the target EGR rate in accordance with the engine speed and engine load. When the combustion is changed to the homogeneous combustion, this control system reduces the target EGR rate to zero and thereby cut off EGR by closing an EGR valve.

SUMMARY OF THE INVENTION

It is an object of the present invention to provide an engine control system capable of controlling the amount of EGR timely to improve the quality of combustion.

In transition from the stratified charge combustion to the homogenous charge combustion, the conventional system closes an EGR valve simultaneously with an actual changeover of the combustion. Therefore, due to a lag in action of the EGR valve, and a transportation lag (distance/velocity lag) of EGR gas, the EGR gas is left behind after the changeover to the homogeneous combustion, and the residual EGR gas tends to degrade the combustion specifically during a transient period during which the engine is operated in the homogeneous combustion mode with a lean air fuel ratio. The engine control system according to the present invention is designed to change over an EGR control mode more adequately to ensure a stable combustion in a transient period from one combustion mode to the other. The present invention aims to ensure stable combustion in an engine operation just after a changeover of combustion.

According to the present invention, an engine control system comprises: an internal combustion engine of a type having at least a combustion control system for controlling a combustion condition in the engine and for changing over a combustion control mode between a stratified combustion mode and a homogeneous combustion mode, and an EGR system for recirculating exhaust gas of the engine into an intake air flow to the engine; and a controller for controlling an EGR quantity by controlling the EGR system, and for changing over an EGR control mode between a stratifying EGR mode suitable for the stratified combustion mode and a homogenizing EGR mode suitable for the homogeneous combustion mode to adapt the EGR quantity to the combustion condition of the engine. The controller is configured to change an EGR control changeover timing of changeover of the EGR control mode between the stratifying mode and the homogenizing mode in accordance with a changeover direction which is one of a first direction from the homogeneous combustion mode to the stratified combustion mode and a second direction from the stratified combustion mode to the homogeneous combustion mode.

Likewise, an engine control process for such an engine according to the present invention comprises at least a controlling step and a changing step. The controlling step is for controlling the EGR quantity of the engine to adapt the EGR quantity to the combustion condition of the engine by changing over the EGR control mode between the stratifying EGR mode for the stratified combustion mode and the homogenizing EGR mode for the homogeneous combustion mode. The changing step is for changing an EGR control changeover timing of changeover of the EGR control mode between the stratifying mode and the homogenizing mode in accordance with the changeover direction.

During an initial homogeneous combustion period immediately after a changeover from the stratified combustion to the homogeneous combustion, the combustion is performed in the homogeneous mode at an air fuel ratio near a lean limit. In this state, the combustion would be readily affected if EGR gas remains due to a delay.

Therefore, when the combustion condition is to be changed from stratified combustion to homogeneous combustion, the engine control system or process according to the present invention can prevent undesired influence due to a delay by advancing the EGR control changeover timing to effect a start of a changeover of the EGR control mode in advance of a changeover of the combustion control mode to the homogeneous mode. For example, the control system or process reduces the EGR quantity to zero, and closes the EGR valve in advance of an actual changeover of combustion to the homogeneous mode, in order to eliminate EGR gas completely by the time of a start of the homogeneous combustion.

When, on the other hand, the combustion condition is to be changed from homogeneous combustion to stratified combustion, the control system or process can retard the EGR control changeover timing to delay a start of the changeover of the EGR control mode until the changeover of the combustion control mode. In this case, the influence by a lag in opening the EGR valve, and a transportation lag of the EGR gas is temporal and not so detrimental to the combustion. Rather, an opening operation of the EGR valve before an actual changeover of combustion could degrade the quality of combustion by introduction of EGR gas to the engine operated still in the homogeneous mode with a lean air fuel ratio. Therefore, in the case of changeover from the homogeneous combustion to the stratified combustion, the control system or process according to the invention can ensure the combustion stability by retarding the changeover of the EGR control mode until the changeover of the combustion.

DETAILED DESCRIPTION OF THE INVENTION

Figure 2:
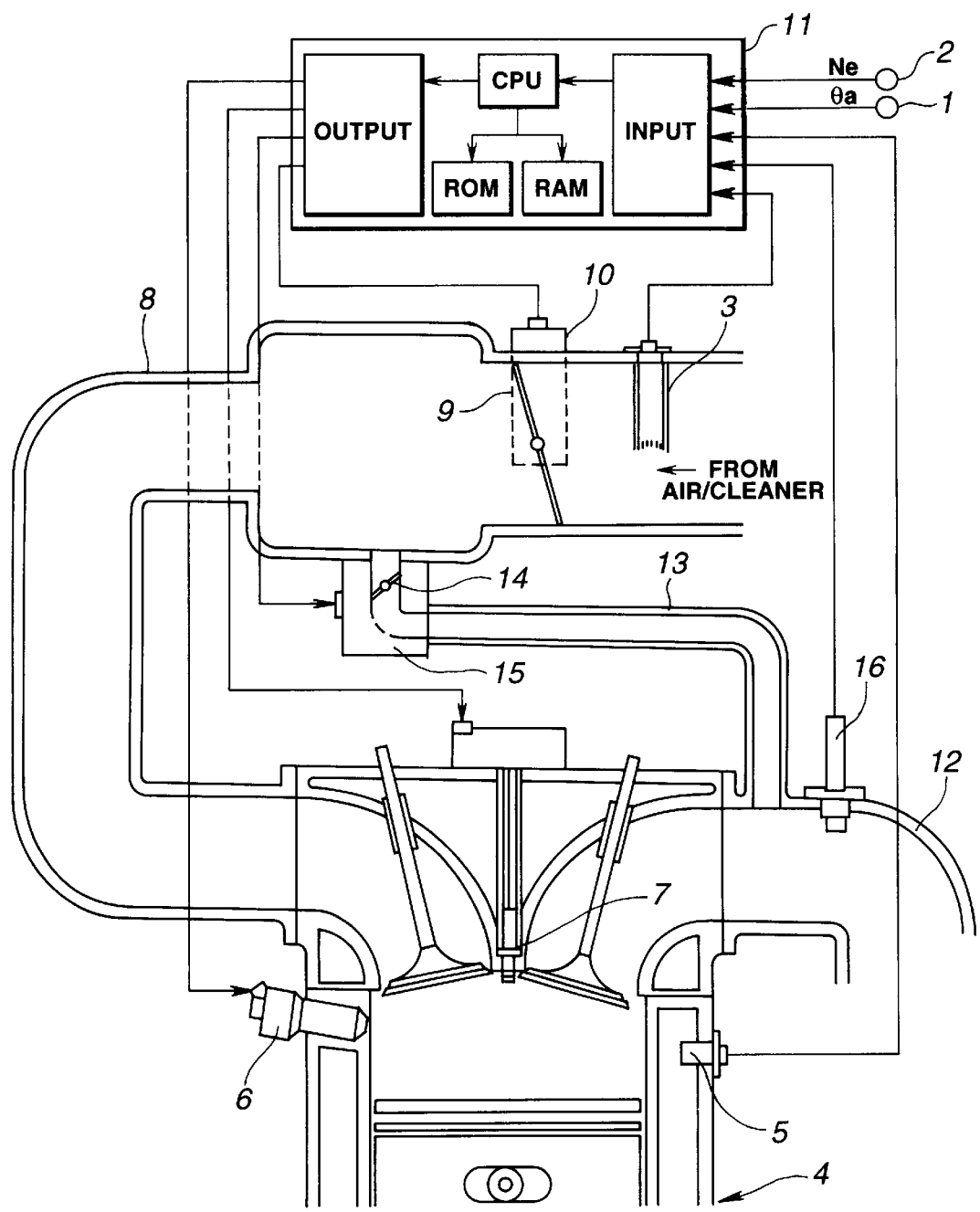
FIG. 2 is a schematic view showing an engine control system according to one embodiment of the present invention.

FIG. 2 shows an engine control system according to one embodiment of the present invention.

The engine control system comprises an input section including a group of sensors, a control section and an output section including devices serving as actuators of the control system.

The input section of this example comprises an accelerator position sensor 1 for sensing a position of an accelerating system of an internal combustion engine 4, a crank angle sensor 2, an air flow sensor (or air flow meter) 3 for sensing an intake air quantity for the engine 4, and a water temperature sensor 5 for sensing the temperature of an engine cooling water. The accelerator sensor 1 of this example senses an opening degree (or a depression degree) of an accelerator pedal of the vehicle. The crank angle sensor 2 of this example produces a position signal signaling each unit crank angle, and a reference signal signaling each cylinder stroke phase difference. The control system can sense the engine speed by measuring the number of pulses per unit time of the position signal, or measuring the period of occurrence of pulses of the reference signal.

The engine 4 comprises a fuel injector 6 and a spark plug 7 for each cylinder. The fuel injector 6 of each cylinder injects fuel directly into the combustion chamber of the engine 4 in response to a fuel injection control signal, and the spark plug 7 initiates ignition in the combustion chamber. A throttle valve 9 is disposed in an intake air passage 8 of the engine 4. A throttle control unit 10 is arranged to electronically control the opening degree of a throttle valve 9 with a throttle actuator such as a DC motor. The throttle valve 9 serves as an intake air metering valve for controlling a fresh intake air quantity to the engine 4. The fuel injectors 6 are controlled in one of a stratified combustion mode and a homogeneous combustion mode. In the stratified combustion mode, the fuel injector 6 of each cylinder injects the fuel into the combustion chamber in the compression stroke to achieve stratified combustion with a very lean air fuel mixture. Under high load conditions, the fuel injector 6 of each cylinder is controlled in the homogeneous combustion mode, and injects fuel into the combustion chamber in the intake stroke to achieve homogeneous combustion to provide more power output. The fuel injectors 6 serve as an actuator for controlling the combustion condition in the engine.

An engine control unit 11 receives signals from the input section to collect input information on engine operating conditions, and controls the opening degree of the throttle valve 9 through the throttle control unit 10, the fuel injection quantity (or fuel supply quantity) and fuel injection timing of each fuel injector 6 and the ignition timing of each spark plug 7 in accordance with the engine operating conditions.

The engine control unit 11 is a main component in the control section of the control system. In this example, the control unit 11 includes at least one computer including at least a central processing unit (CPU), a memory section having ROM and RAM and input and output sections, as shown in FIG. 2.

The fuel injectors 6 are components of the fuel system of the engine 4, which in this example is the fuel injection system. The spark plugs 7 are components of the ignition system of the engine 4. The engine 4 further includes the intake system constituted by the intake passage 8, the throttle valve 9 etc., the exhaust system including at least an exhaust gas passage 12 of the engine, and an EGR (exhaust gas recirculating) system connecting the exhaust system with the intake system.

The EGR system of the engine 4 comprises an EGR passage 13 connecting the exhaust passage 12 with the intake passage 8, and an EGR control valve 14 disposed in the EGR passage 12. An EGR control unit 15 is arranged to electronically control the opening of the EGR valve 14. In this example, the EGR control unit 15 comprises a stepper motor for accurately controlling the position of the EGR valve 14. The EGR control unit 15 varies the opening degree of the EGR valve 14 and thereby controls the amount of EGR.

The control unit 11 calculates a target intake air quantity from the accelerator opening θa and the engine revolution speed Ne, and controls the opening degree of the throttle valve 9 to achieve the target intake air quantity by delivering a drive signal to the throttle valve control unit 10. The engine control unit 11 further controls the opening degree of the EGR valve 14 by sending a drive signal (or EGR control signal) to the EGR control unit 15, and thereby varies the EGR condition of the engine 4. The control unit 11 activates EGR in a predetermined engine operating region (EGR region) to achieve a desired target EGR rate (EGR gas quantity/intake air quantity). The EGR region is expressed by the engine load (such as the accelerator opening θa or the fuel injection quantity), and the engine speed.

The input section of this example further includes an air fuel ratio sensor 16 provided in the exhaust passage 12 of the engine, for sensing the air fuel ratio of the air fuel mixture by sensing a concentration of a predetermined component such as oxygen in the exhaust gas mixture.

Figure 3:
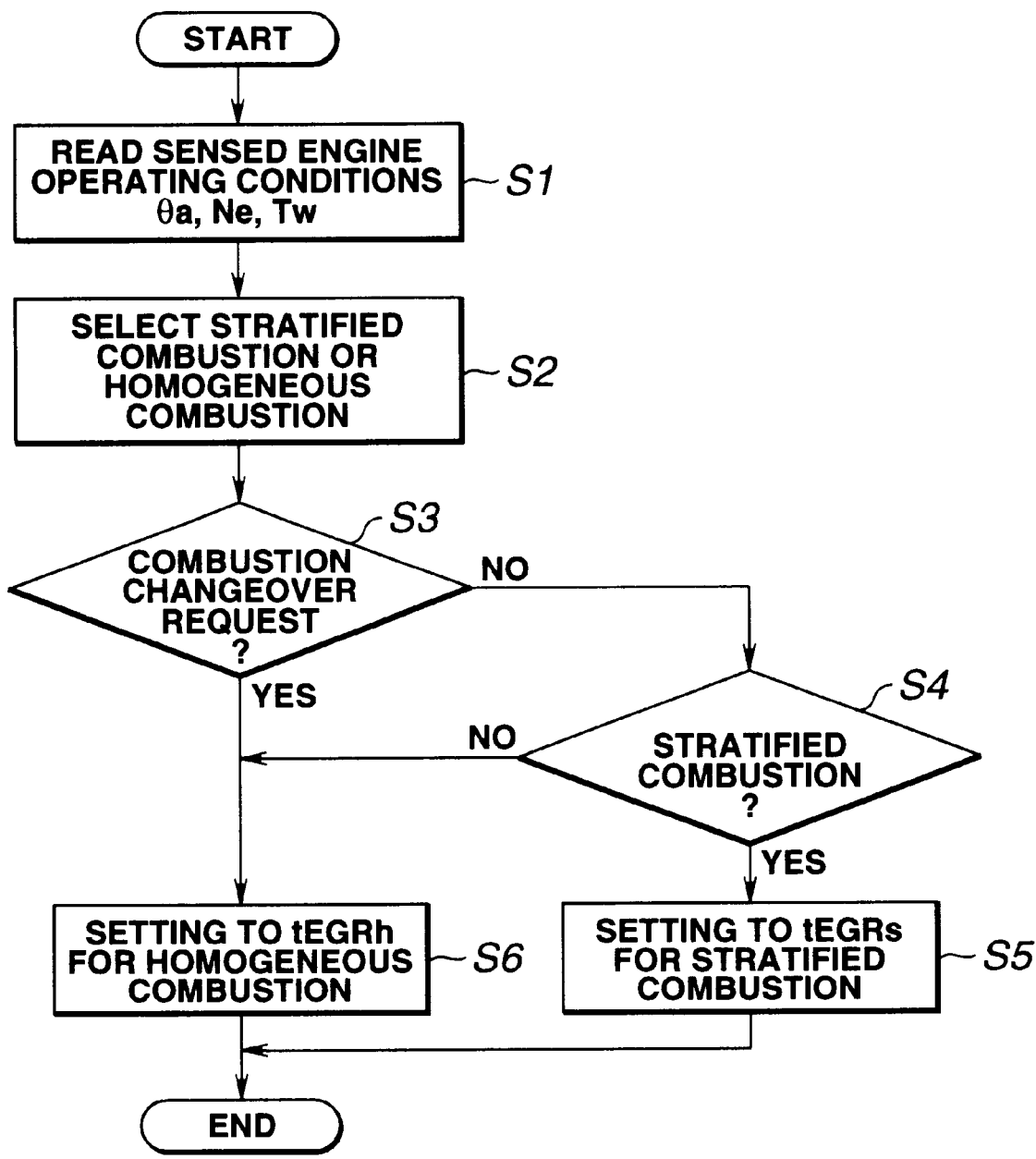
FIG. 3 is a flow chart showing an EGR control routine in a first example according to the embodiment.

FIG. 3 shows an EGR changeover timing control procedure performed by the control unit 11.

At a step S1, the control unit 11 reads the sensed engine operating conditions, such as the accelerator opening (or depression) degree θa, the engine speed Ne, and the engine coolant temperature Tw, supplied from the input section.

At a step S2, the control unit 11 selects, as a desired target combustion mode, one of the stratified combustion mode and the homogeneous combustion mode in accordance with the sensed engine operating conditions.

At a step S3, the control unit 11 determines whether there exists a combustion mode changeover request for a combustion mode changeover between the stratified combustion mode and the homogeneous combustion mode. The control system does not carry out a changeover of the actual combustion immediately upon receipt of the mode changeover request, in order to prevent a step change in torque due to a response delay in the intake air quantity. The control system varies the equivalent ratio gradually to a new target value, and performs an actual changeover of the combustion at such a timing as not to cause a step torque change.

In this example, the control unit 11 switches a first target combustion condition flag FSTR1 immediately when the combustion mode change request is generated in accordance with the engine operating conditions, and thereafter switches a second target combustion condition flag FSTR2 when the combustion is actually changed. In this example, the first flag FSTR1 is zero for the homogeneous combustion, and one for the stratified combustion, and the second flag FSTR2 is also zero for the homogeneous combustion, and one for the stratified combustion. In this example, the combustion mode changeover request exists during the period from the generation of the combustion mode changeover request to the actual changeover of the combustion. That is, the combustion mode changeover request exists while the first and second target combustion condition flags FSTR1 and FSTR2 are not equal to each other.

When there is no combustion mode changeover request, the control unit 11 proceeds from the step S3 to a step S4. At the step S4, the control unit 11 determines whether the current combustion mode is the stratified combustion mode or not, by checking whether the second combustion condition flag FSTR2 is one or not. If it is, the control unit 11 proceeds to a step S5, and sets a target EGR rate tEGR to a stratified mode target EGR rate tEGRs suitable to the stratified combustion. If the current mode is the homogeneous combustion mode, the control unit 11 proceeds from the step S4 to a step S6 and sets the target EGR rate tEGR to a homogeneous mode target EGR rate tEGRh suitable to the homogeneous combustion.

When there exists the combustion mode changeover request, the control unit 11 proceeds from the step S3 to the step S6, and sets the target EGR rate tEGR to the homogenous mode target EGR rate tEGRh for the homogeneous combustion. That is, the target EGR rate tEGR is held equal to the homogeneous mode target EGR rate tEGRh during the period from the generation of the combustion mode changeover request to the actual changeover of the combustion.

Figure 4:
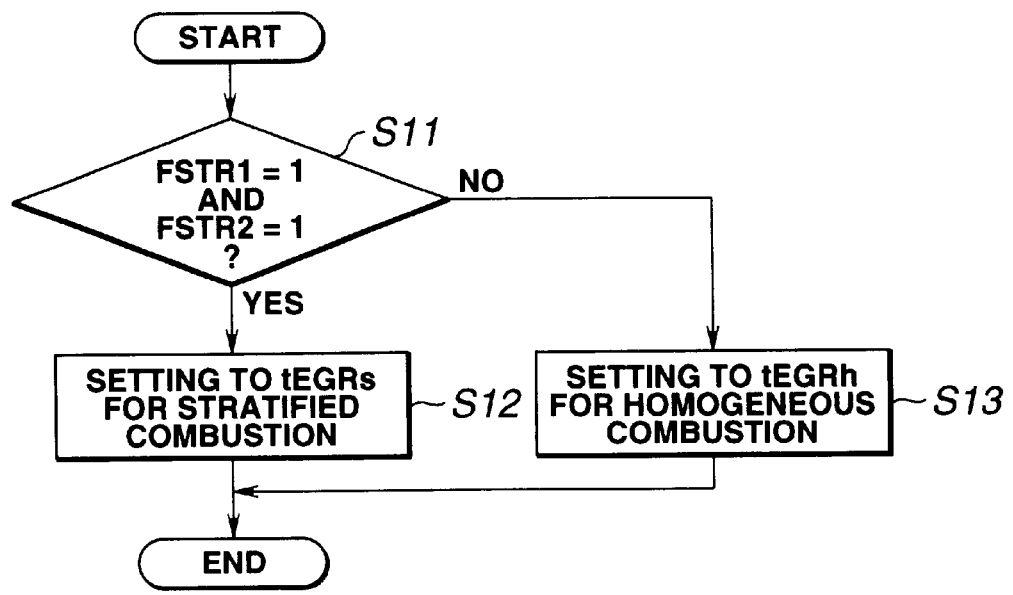
FIG. 4 is a flow chart showing a variation of the EGR control routine of FIG. 3.

FIG. 4 shows a variation of the EGR changeover timing control procedure performed by the control unit 11. In the control logic of FIG. 4, the control unit 11 determines at a step S11 whether the first and second target combustion condition flags FSTR1 and FSTR2 are both equal to one or not. If they are equal to one, then the control unit 11 proceeds to a step S12, and sets the target EGR rate tEGR to the stratified mode EGR rate tEGRs at the step S12. If either or both of the first and second target combustion condition flags FSTR1 and FSTR2 is equal to zero, then the control unit 11 proceeds from the step S11 to a step S13, and sets the target EGR rate tEGR to the homogeneous mode target EGR rate tEGRh.

Figure 5:
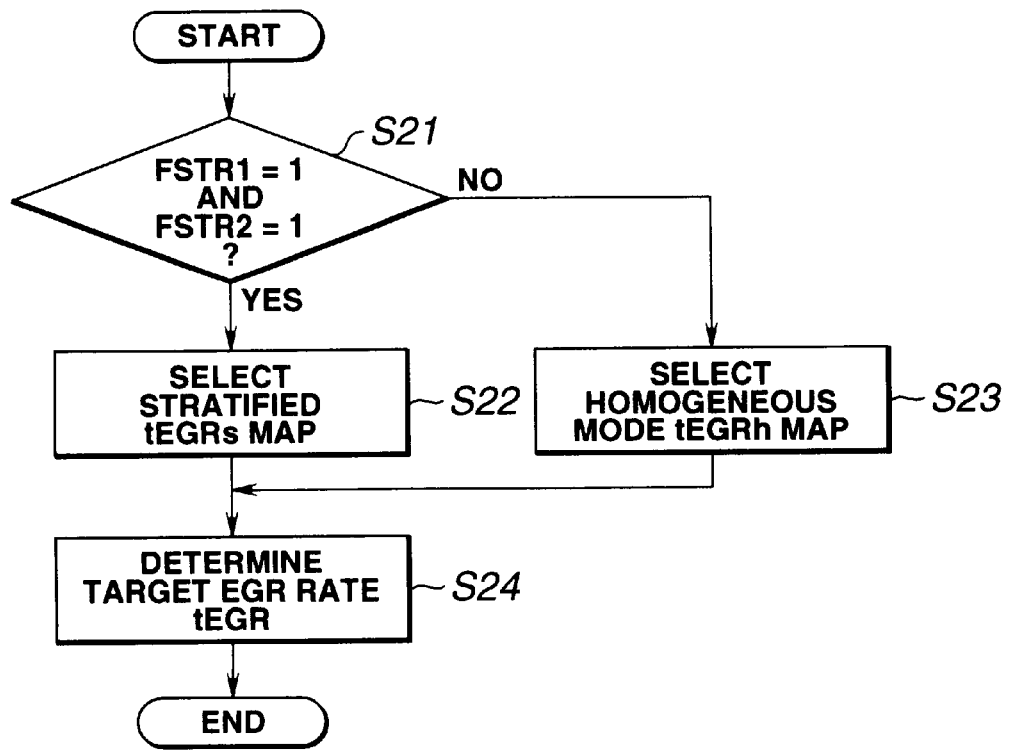
FIG. 5 is a flow chart showing a second variation of the EGR control routine of FIG. 3.
Figure 11:
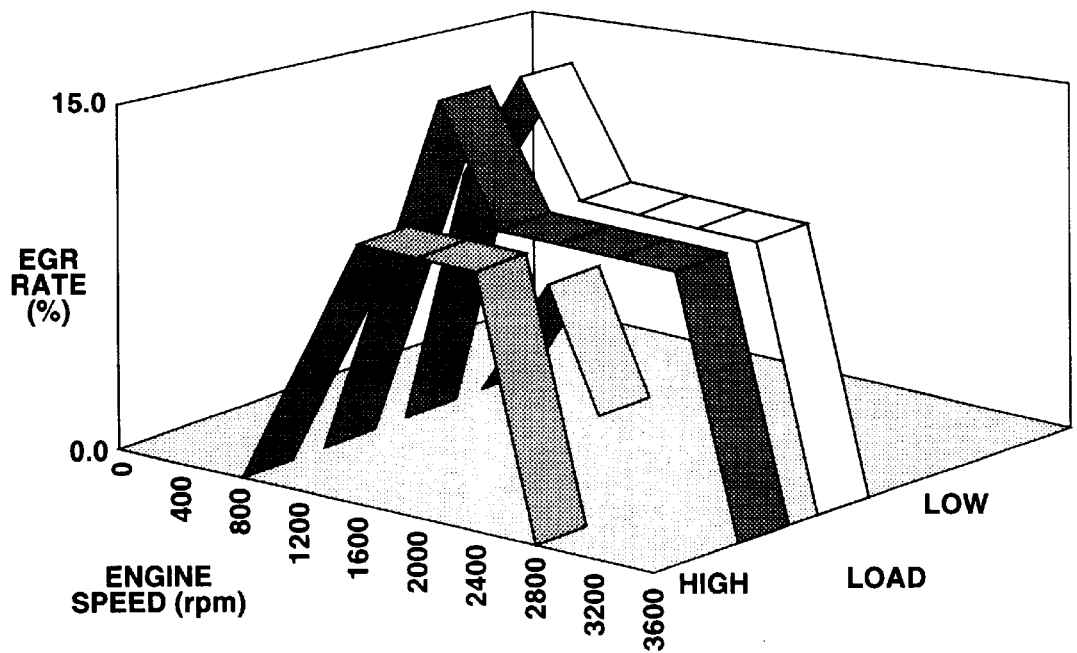
FIG. 11 is a view showing an EGR map for a homogeneous stoichiometric combustion control mode, used in the embodiment.
Figure 12:
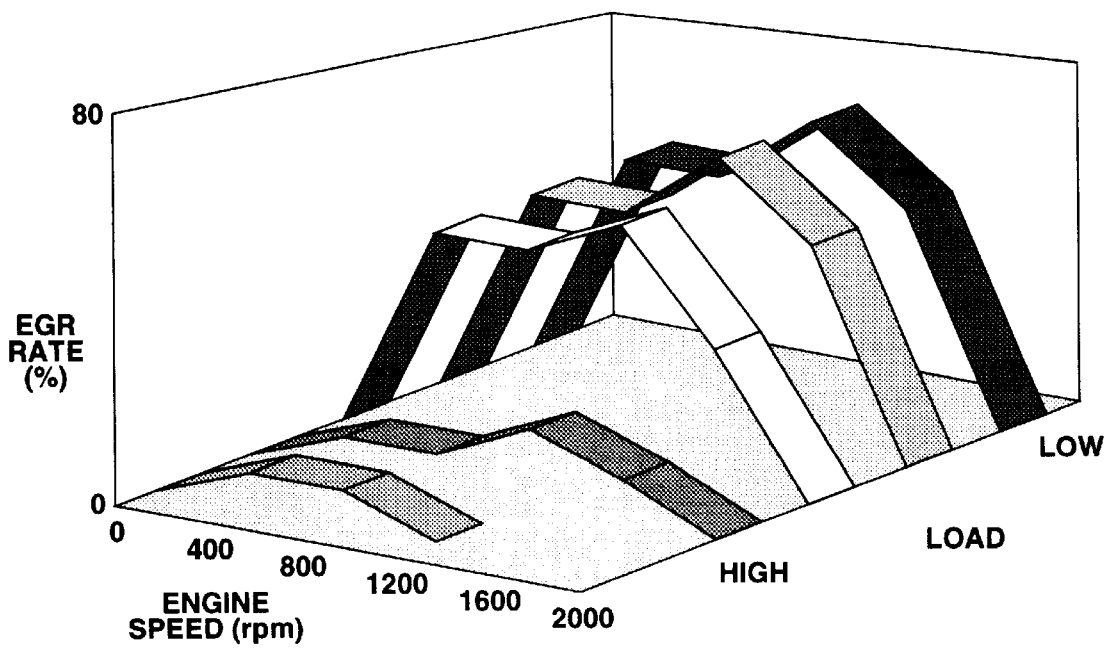
FIG. 12 is a view showing an EGR map for a stratified combustion mode, used in the embodiment.

FIG. 5 shows another variation of the EGR changeover timing control procedure performed by the control unit 11. At a step S21, the control unit 11 determines, as in the step S11, whether the first and second target combustion condition flags FSTR1 and FSTR2 are both equal to one or not. If both are equal to one, then the control unit 11 proceeds to a step S22, and selects a map of the stratified mode target EGR rate tEGRs at the step S22. If at least one of the first and second target combustion condition flags FSTR1 and FSTR2 is equal to zero, then the control unit 11 proceeds from the step S21 to a step S23, and selects a map of the homogeneous mode target EGR rate tEGRh at the step S23. Then, at a step S24, the control unit 11 determines a value of the target EGR rate tEGR in accordance with at least one engine operating condition by using a selected one of the maps. FIGS. 11 and 12 show, as an example, EGR maps that the steps S22 and S23 can employ. When, in this case, the answer of the step S21 is affirmative, the control unit 11 selects, at the step S22, the EGR map shown in FIG. 12, and determines the target EGR rate, at the step S24 by using the EGR map of FIG. 12, in accordance with the engine operating conditions including at least the engine load and engine speed. When the answer of the step S21 is negative, the control unit 11 selects, at the step S23, the EGR map shown in FIG. 11, and determines the target EGR rate, by using the EGR map of FIG. 11, in accordance with the engine load, engine speed and one or more other parameters.

In these processes according to the embodiment of the present invention, the control system differentiates the changeover timing of the EGR control between the changeover from the stratified combustion to the homogeneous combustion and the changeover from the homogeneous combustion to the stratified combustion. In the case of changeover from the homogeneous combustion to the stratified combustion, the control system holds the EGR rate at the homogeneous mode target EGR rate tEGRh from generation of the combustion mode changeover request to actual changeover to the homogeneous combustion. The control system changes the EGR rate to the stratified mode target EGR rate tEGRs after actual changeover to the stratified combustion.

In the case of changeover from the stratified combustion to the homogeneous combustion, the control system changes the target EGR rate tEGR to the homogeneous mode target rate tEGRh immediately upon receipt of the mode change request from the stratified combustion to the homogeneous combustion mode, and holds the target EGR rate tEGR at the homogeneous mode target EGR rate tEGRh even after the actual changeover to the homogeneous combustion.

Figure 6:
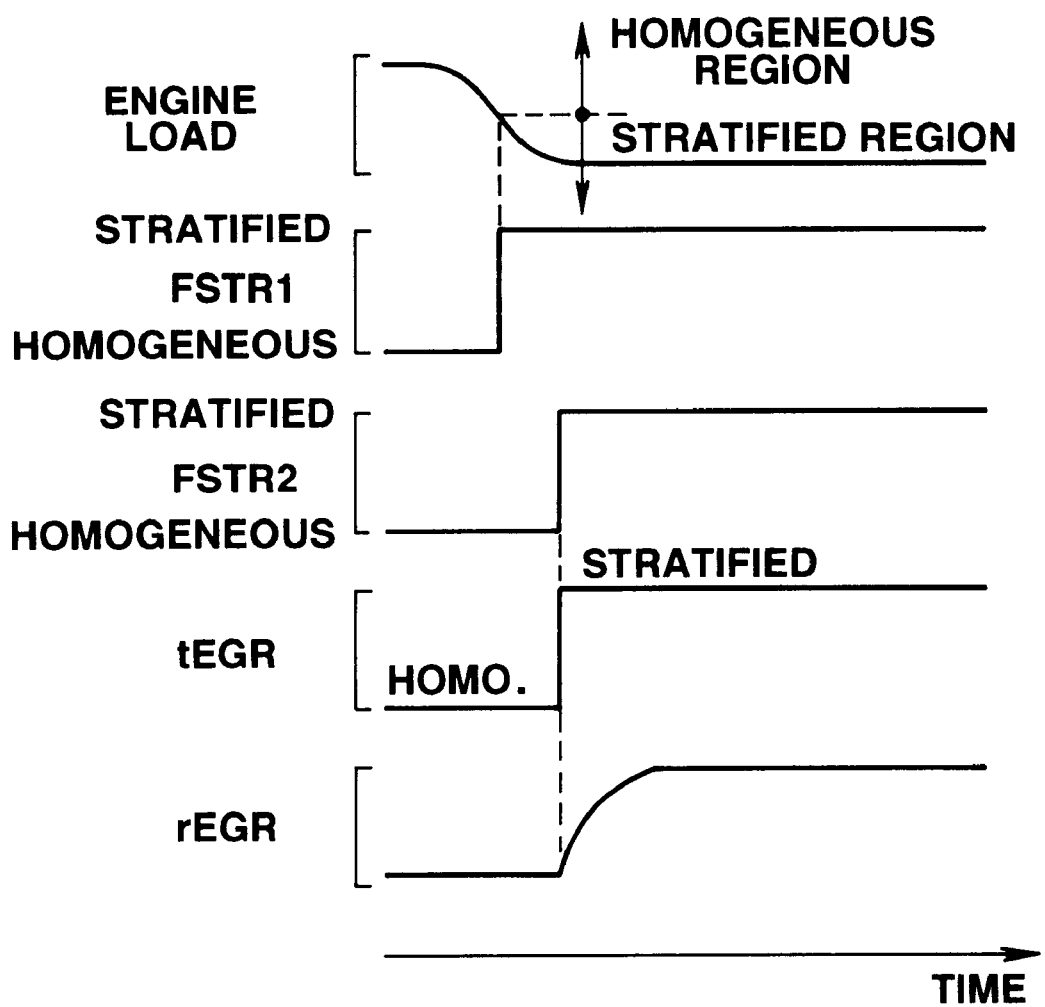
FIG. 6 is a time chart showing variables varying with time to illustrate time dependent events occurring in the control system according to the embodiment in the case of changeover from homogeneous combustion to stratified combustion.
Figure 7:
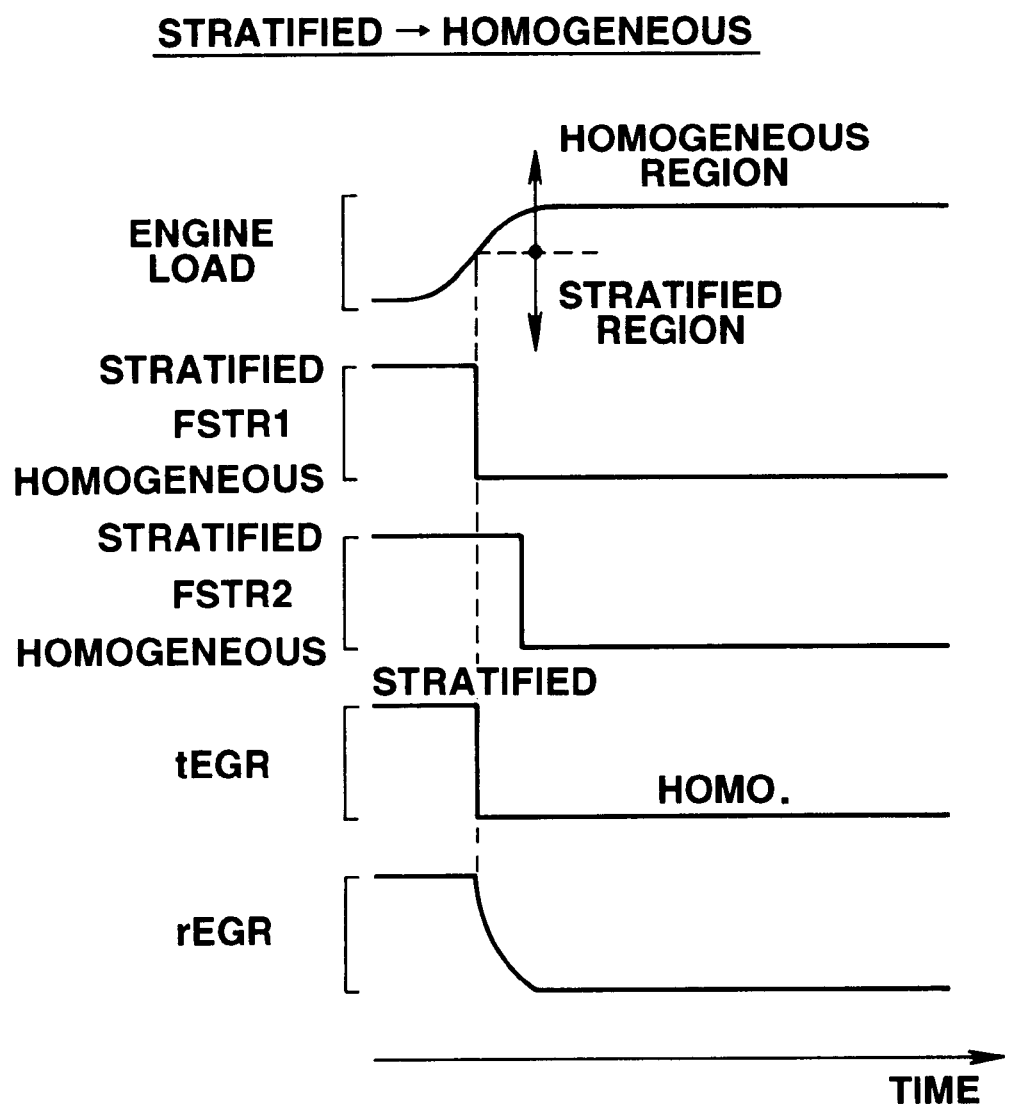
FIG. 7 is a time chart of the variables show in FIG. 6 in the case of changeover from stratified combustion to homogeneous combustion.

FIGS. 6 and 7 illustrate operations of the control system according to the first practical example of the embodiment.

There are a transportation lag of the EGR gas and a time delay from a change in the target EGR rate, to completion of an actual change of the EGR valve 12 driven by the actuator such as stepper motor, to the opening degree corresponding to the target EGR rate. To ensure stable homogeneous combustion at a lean air fuel ratio near a changeover with the stratified combustion, the control system cuts off EGR by setting the target EGR rate tEGR equal to zero. In the stratified combustion, on the other hand, the control system utilizes EGR positively by increasing the target EGR rate, but a temporal decrease in the EGR rate is not so influential on the combustion.

Therefore, in the case of changeover from the homogeneous combustion to the stratified combustion, as shown in FIG. 6, the control system maintains stable homogeneous combustion by continuing to hold the target EGR rate tEGR at the homogeneous mode target EGR rate tEGRh after generation of a combustion changeover request in accordance with the engine operating condition such as the engine load, until the actual combustion is changed to the stratified combustion. After the changeover of the actual combustion to the stratified form, the control system changes the target EGR rate tEGR to the stratified mode target rate tEGRs and thereby opens the EGR valve 14 to achieve stable stratified combustion. The homogeneous combustion before the changeover is not affected by the EGR gas because the EGR gas is introduced after the combustion changeover.

In the case of changeover from the stratified combustion to the homogeneous combustion, as shown in FIG. 7, the control system changes the target EGR rate tEGR to the homogeneous mode target rate tEGRh and closes the EGR valve 14 immediately when a combustion changeover request to the homogeneous mode is generated in accordance with the engine operating condition such as the engine load. The control system starts closing the EGR valve 14 without delay, and thereby brings the actual EGR rate rEGR to the target rate tEGRh appropriate for the homogeneous combustion timely in spite of the driving lag of the EGR valve 14 and the transportation lag of the EGR gas. The control system can eliminate the EGR gas completely by reducing the target EGR rate to zero and closing the EGR valve earlier.

Figure 8:
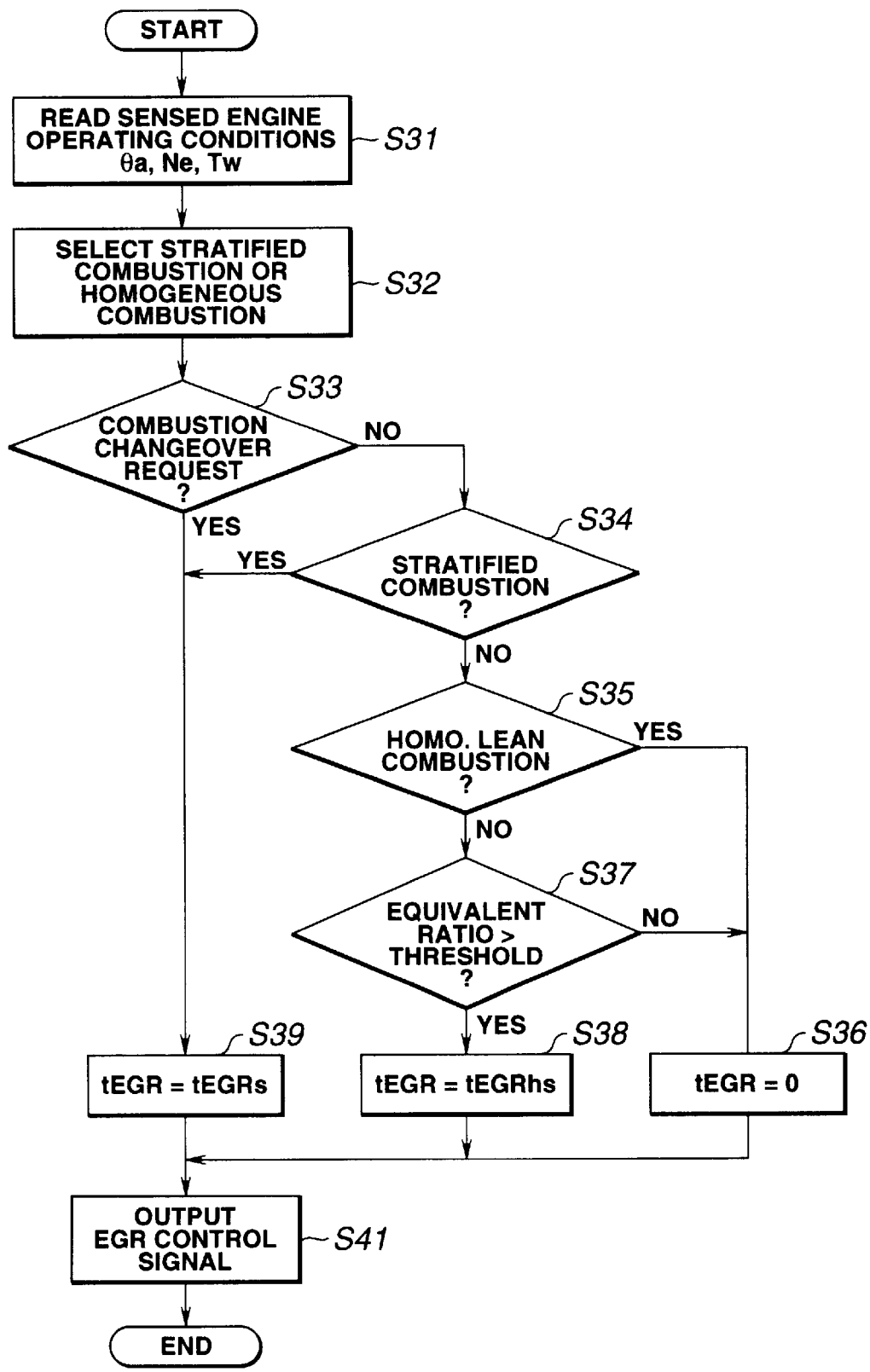
FIG. 8 is a flow chart showing an EGR control routine in a second example according to the embodiment.

FIG. 8 shows an EGR changeover control procedure of a second example according to the embodiment of the present invention. In the second example, the control system has the stratified combustion mode as in the preceding embodiment. In addition, the control system of the second example has two different homogeneous combustion modes; a homogeneous stoichiometric (or richer) combustion mode for producing homogeneous combustion at or near a theoretical air fuel ratio, and a homogeneous lean combustion mode for producing homogeneous combustion at a leaner air fuel ratio (of about 20). The control system switches the combustion mode among these three different combustion modes, in accordance with the engine operating conditions. FIG. 8 shows the procedure for setting the target EGR rate to one of a homogeneous lean combustion mode target EGR rate tEGRhl adapted to the homogeneous lean combustion, a homogeneous stoichiometric combustion mode target EGR rate tEGRhs adapted to the homogeneous stoichiometric combustion and a stratified combustion mode target EGR rate tEGRs adapted to the stratified combustion.

Steps S31~S34 are substantially identical to the steps S1~S4 of FIG. 2.

A step S35 is reached when the control unit 11 judges at the step S34 that the current combustion is homogeneous combustion. At the step S35, the control unit 11 checks a flag FLEAN, and thereby determines whether the target combustion mode is the homogeneous lean combustion mode, or not (the homogeneous stoichiometric combustion mode). The flag FLEAN is a condition code set and reset in accordance with the engine operating conditions.

When the target is the homogeneous lean combustion, the control unit 11 proceeds from the step S35 to a step S36, and sets the target EGR rate tEGR to the homogeneous lean mode target rate tEGRhl for the homogeneous lean combustion mode at the step S36. In this example, the homogeneous lean mode target EGR rate tEGRhl is zero, and the target EGR rate tEGR is set to zero at the step S36. The homogeneous lean mode target EGR rate tEGRhl is set equal to zero because the combustion is generally unstable in the homogeneous lean combustion mode.

When the target is the homogeneous stoichiometric combustion, the control unit 11 proceeds from the step S35 to a step S37, and determines at the step S37 whether the equivalent ratio is equal to or greater than a predetermined lower limit value (or threshold value TFBYA0) required to allow the homogeneous stoichiometric combustion mode EGR rate. In steady state homogeneous stoichiometric combustion at the theoretical air fuel ratio, the equivalent ratio is set greater than the predetermined lower limit value. However, in transition from the stratified combustion to the homogeneous stoichiometric combustion, in order to vary the torque smoothly, the control system of this example increases the equivalent ratio gradually and continues increasing the equivalent ratio to the target theoretical air fuel ratio even after changeover of the actual combustion to the homogeneous combustion. Therefore, when the equivalent ratio is still too small as compared with the equivalent ratio for the homogeneous stoichiometric combustion, and the actual combustion is still in the form of the homogeneous lean combustion, the control system waits, without immediately changing the EGR rate to the rate of the homogeneous stoichiometric combustion, until the equivalent ratio reaches the predetermined lower limit value. Too early changeover to the EGR rate EGRhs of the homogeneous stoichiometric combustion would deteriorate the quality of combustion. To prevent such deterioration, the control system sets the target EGR rate tEGR to the homogeneous lean mode rate tEGRhl (=0) at the step S36 until the equivalent ratio becomes equal to the predetermined lower limit. When the equivalent ratio becomes greater than the predetermined value, the control system proceeds from the step S37 to a step S38, and changes over the target EGR rate tEGR to the rate tEGRhs of the homogeneous stoichiometric combustion.

When the answer of the step S33 is affirmative because of the existence of a combustion changeover request, or when the answer of the step S34 is affirmative because of judgement that the actual combustion is the stratified form, the control system proceeds to a step S39 and selects the target rate tEGRs for the stratified combustion mode.

Figure 9:
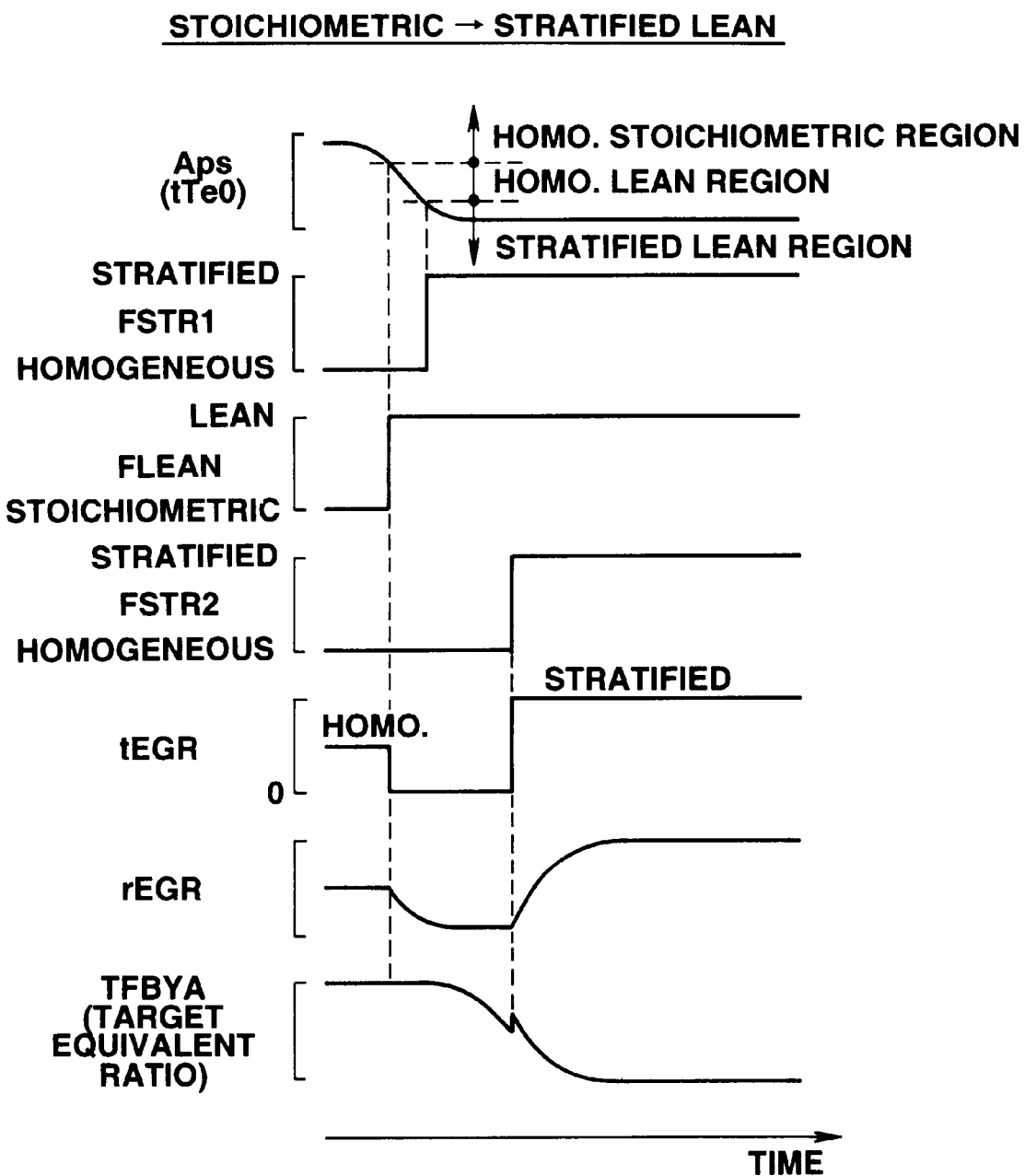
FIG. 9 is a time chart showing variables varying with time to illustrate time dependent events occurring in the second practical example according to the embodiment in the case of changeover from homogeneous stoichiometric combustion mode to stratified combustion.
Figure 10:
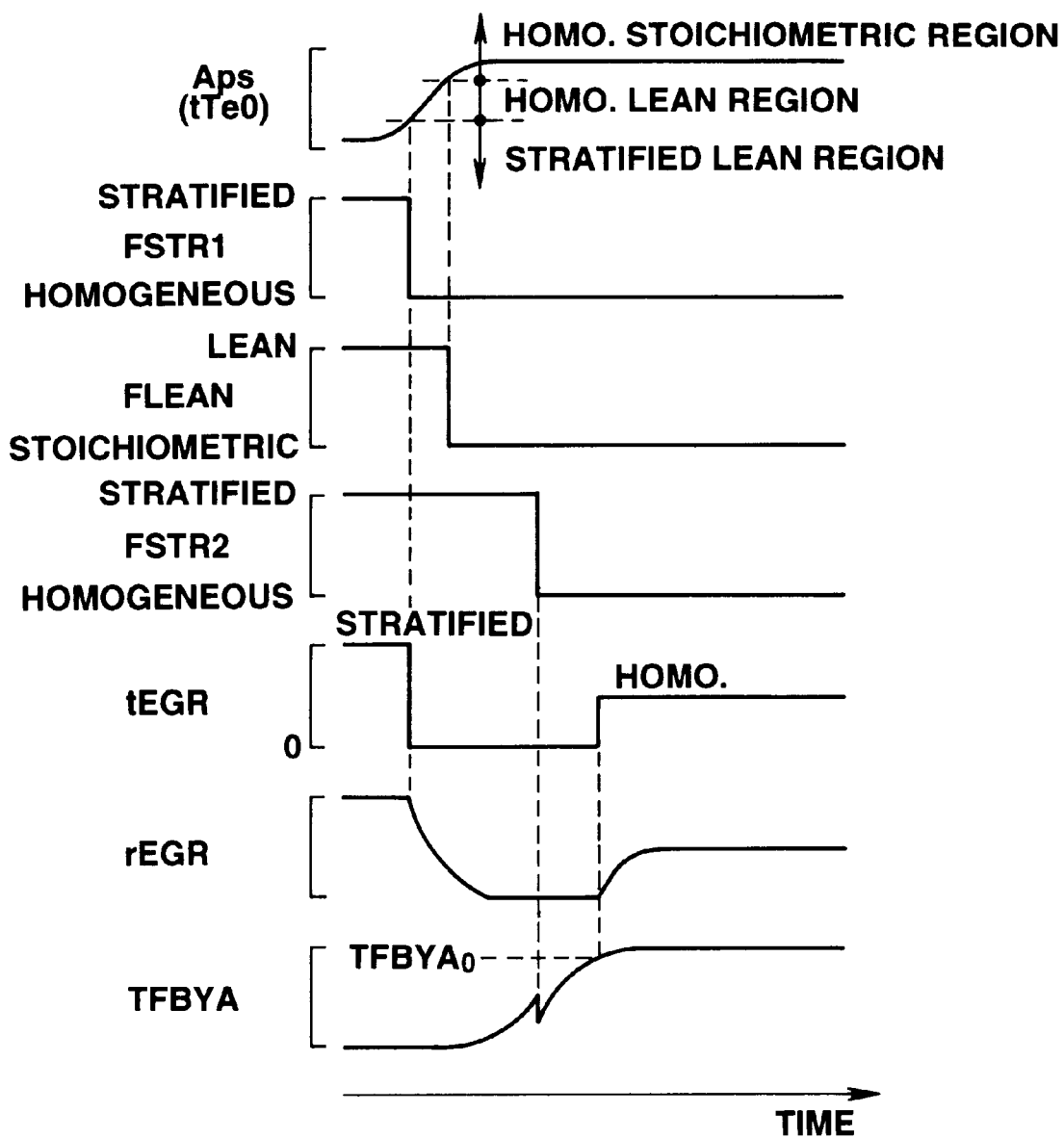
FIG. 10 is a time chart of the variables show in FIG. 9 in the case of changeover from stratified combustion to homogeneous stoichiometric combustion.

FIGS. 9 and 10 show operations of the control system of the second practical example.

FIG. 9 shows a changeover operation from the homogeneous stoichiometric combustion mode to the stratified combustion mode. The control unit 11 monitors a predetermined engine operating parameter indicative of engine load, determined in accordance with one or more sensed engine operating conditions. For example, the engine operating parameter is a variable representing a target engine torque tTe0 which is determined in accordance with the accelerator opening Aps and the engine speed Ne. When, for example, the target engine torque tTe0 decreases from a predetermined first region for the homogeneous stoichiometric combustion mode to a predetermined second region for the homogeneous lean combustion mode, with a decrease in the accelerator opening, then the control unit 11 changes the target combustion mode from the homogeneous stoichiometric combustion mode to the homogeneous lean combustion mode and changes the third target combustion condition flag FLEAN from a level indicating the stoichiometric mode, to a level of the homogeneous lean mode. At the same time, the control unit 11 decreases the target EGR rate tEGR from the first target rate tEGRhs for the homogeneous stoichiometric mode to the second target rate tEGRhl (=0) adapted to the homogeneous lean combustion mode. Accordingly, the actual EGR rate decreases to zero, as shown in FIG. 9.

The combustion condition is thus changed from the homogeneous stoichiometric combustion to the homogeneous lean combustion. When the combustion is changed to the homogeneous lean combustion, the control system stops EGR and controls the EGR condition adequately to always ensure satisfactory combustion.

When the load indicative engine operating parameter further varies from the second region of the homogeneous lean mode to a predetermined third region of the stratified combustion mode, a combustion changeover request is generated, and the first target combustion condition flag FSTR1 is changed from the value of the homogeneous combustion to the value of the stratified combustion. Then, the control system changes over the target EGR rate tEGR from the homogeneous lean mode target tEGRhl (=0) to the stratified mode target EGR rate tEGRs when the combustion is changed to the stratified mode. Therefore, the actual EGR rate rEGR increases to the stratified mode target EGR rate tEGRs, as shown in FIG. 9.

In the homogeneous stoichiometric combustion mode, the combustion is relatively stable. Therefore, the control system can reduce NOx without degrading the quality of combustion by the EGR to a limited amount. In the homogeneous lean mode, on the other hand, the combustion is generally unstable, and the combustion is significantly affected by the EGR. Therefore, in the process of changeover from the homogeneous stoichiometric combustion to the stratified combustion through the homogeneous lean combustion, the control system cuts off EGR promptly by reducing the target EGR rate to zero at the time of changeover of the target combustion from the homogeneous stoichiometric mode to the homogeneous lean mode before a changeover of the actual combustion to the homogeneous lean mode. Then, the control system changes the target EGR rate from the value for the homogeneous lean mode to the value for the stratified combustion after a changeover of the actual combustion to the stratified mode, to prevent degradation of combustion during the homogeneous lean combustion.

FIG. 10 shows a changeover operation from the stratified combustion mode to the homogeneous stoichiometric combustion mode.

In accordance with an increase in the target engine torque tTe0, the control system first changes the first target combustion condition flag FSTR1 from the value of the stratified mode to the value of the homogeneous mode to signal a combustion changeover request. Simultaneously with this changeover of the condition flag FSTR1, the target EGR rate is changed to zero. Then, the third flag FLEAN is changed from the lean mode value to the stoichiometric mode value in accordance with the changeover from the homogeneous lean combustion to the homogeneous stoichiometric combustion. Then, the second flag FSTR2 is changed from the stratified mode value to the homogeneous mode value in response to the actual changeover of the combustion. However, the control system continues holding the target EGR rate tEGR equal to zero.

With an increase in the target engine torque tTe0, the target equivalent ratio TFBYA is increased as shown in FIG. 10. When the target equivalent ratio TFBYA reaches the predetermined value TFBYA0, the control system changes the target EGR rate tEGR to the stoichiometric mode rate tEGRhs. Accordingly, the actual EGR rate rEGR is increased to the rate tEGRhs.

Thus, the control system maintains the quality of combustion by cutting off the EGR operation, even after the changeover of the actual combustion to the homogeneous combustion, until the target equivalent ratio becomes sufficiently high.

In this way, the control system reduces the target EGR rate to zero promptly in response to the changeover request from the stratified combustion to the homogeneous combustion, before the changeover to the homogeneous combustion, and retards a restart of EGR with the EGR rate adapted to the homogeneous stoichiometric mode until the equivalent ratio approaches sufficiently to the stoichiometric level.

The present invention is applicable to engines of various types. For example, an engine usable in the invention comprises an engine block assembly of a cylinder block, a cylinder head, etc., a first (or combustion control) system capable of controlling the combustion condition in each cylinder of the engine, and capable of changing over the combustion control mode between the stratified combustion mode and the homogeneous combustion mode, and a second (EGR) system for controlling the EGR condition by regulating an EGR gas flow.

The first (or combustion control) system of the engine may comprise at least one of a fuel system and an ignition system. In one example shown in FIG. 1, the first system includes a fuel system 201 such as a fuel injection system and an ignition system 202. The second system includes at least an EGR control actuator 203. The illustrated embodiment is constructed in the same manner. The fuel injectors 6 are component of the fuel system, and the spark plugs 7 are components of the ignition system. The EGR system comprises items 13, 14, 15 etc.

In the illustrated embodiment of the invention, the EGR control actuator 203 comprises at least one of the EGR control valve 14 and its actuator 15.

Figure 1:
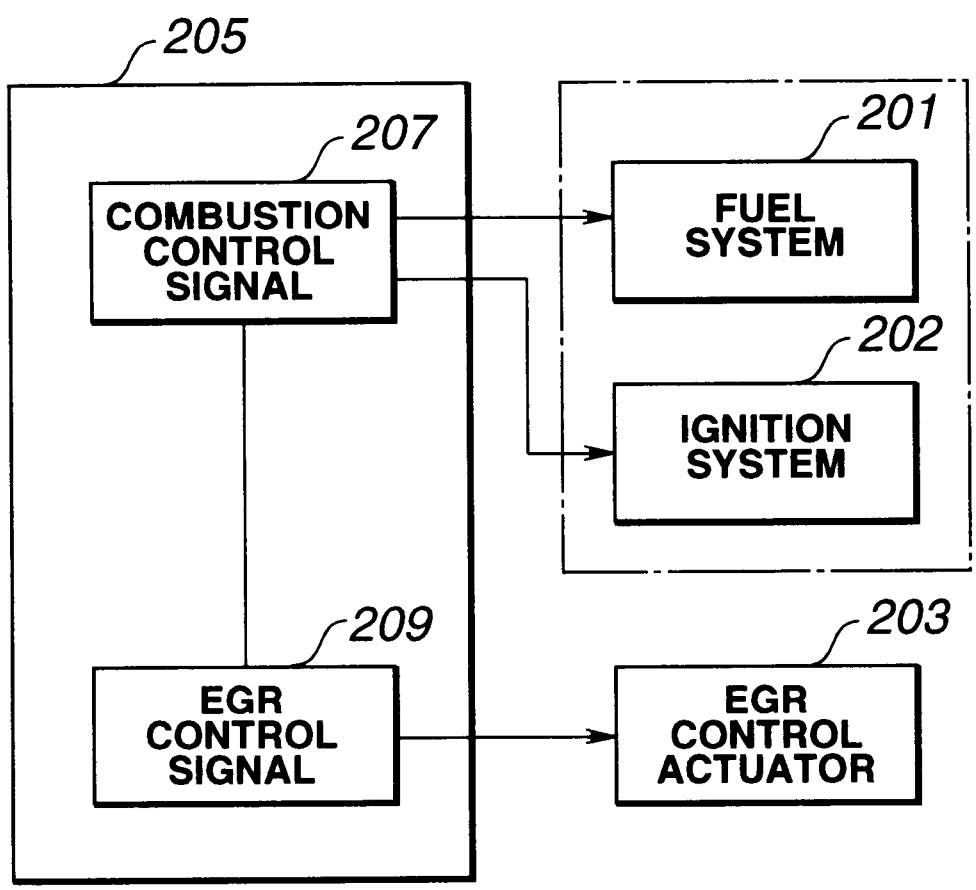
FIG. 1 is a block diagram for facilitating understanding of a basic configuration and function of the present invention.

In the example shown in FIG. 1, the controller comprises a first section 207 and a second section 209. The first section 207 is a section for producing at least one combustion control signal, such as a control signal for controlling fuel injection timing and fuel injection quantity and/or a control signal for controlling ignition timing, and for changing over the combustion between stratified combustion and homogeneous combustion by changing the control mode of the control signal. For example, the first section 207 changes over the combustion control mode, by changing the fuel injection timing between a timing for the stratified combustion and a timing for the homogeneous combustion. The second section 209 produces an EGR control signal to control the EGR condition with the EGR control actuator 203. The second section 209 achieves the desired target EGR quantity by sending the EGR control signal representing the target quantity to the actuator 203. It is possible to add a step S7 to the flow chart of FIG. 3 at a position following the step S6 and S5, just before the ending section. In this case, the control unit 11 proceeds from the step S6 or S5 to the step S7, and produces the EGR control signal representing the target EGR quantity selected at the step S5 or S6, and then terminates this routine.

The control system may be mounted on a vehicle. Preferably, the controller comprises at least one onboard computer. The first and second sections 207 and 209 may be two sections in one computer module, or may be two separate computer modules.

In one example, the controller determines a first engine operating parameter and a second engine operating parameter in accordance with the sensed engine operating conditions. The controller produces a combustion changeover request signal when the first parameter varies from one predetermined region to another predetermined region, and thereafter changes over the combustion mode in response to the request signal when the second parameter varies from one predetermined region to another predetermined region. The first parameter may be a parameter indicative of engine load, such as the calculated target engine torque. The second parameter may be a parameter indicative of the target equivalent ratio determined in accordance with the engine operating conditions. The controller may be configured to synchronize the target equivalent ratio with the phase of the intake air quantity in transition from one combustion mode to another.

What is claimed is:

1. An engine control system comprising:
    an internal combustion engine comprising a combustion control system for controlling a combustion condition in the engine by changing over a combustion control mode between a stratified combustion mode and a homogeneous combustion mode, and an EGR system for recirculating exhaust gas of the engine to an intake air flow to the engine; and
    a controller for controlling an EGR quantity by controlling the EGR system, for changing over an EGR control mode between a stratifying EGR mode for the stratified combustion mode and a homogenizing EGR mode for the homogeneous combustion mode to adapt the EGR quantity to the combustion condition of the engine, and for changing an EGR control changeover timing of changeover of the EGR control mode between the stratifying mode and the homogenizing mode in accordance with a changeover direction which is one of a first direction from the homogeneous combustion mode to the stratified combustion mode and a second direction from the stratified combustion mode to the homogeneous combustion mode; the controller advancing the EGR control changeover timing to effect a start of a changeover of the EGR control mode in advance of a changeover of the combustion control mode when the changeover direction is the second direction from the stratified combustion mode to the homogeneous combustion mode.

2. The engine control system according to claim 1 wherein the EGR system of the engine comprises an EGR passage extending from an exhaust system of the engine to an intake system of the engine, and an EGR valve disposed in the EGR passage, and the controller produces an EGR control signal to control an opening degree of the EGR valve to control the EGR quantity in one of the stratifying EGR mode and the homogenizing EGR mode.

3. The engine control system as claimed in claim 1 wherein the controller retards the EGR control changeover timing to effect a start of a changeover of the EGR control mode later when the changeover direction is the first direction from the homogeneous mode to the stratified mode than when the changeover direction is the second direction from the stratified combustion mode to the homogeneous combustion mode.

4. The engine control system as claimed in claim 1 wherein the controller monitors an engine operating condition of the engine to detect occurrence of a combustion changeover request requesting changeover of the combustion control mode between the stratified and homogeneous combustion modes, sets the EGR control changeover timing at a time of occurrence of the combustion changeover request when the changeover direction is the second direction from the stratified combustion mode to the homogeneous combustion mode, and retards the EGR control changeover timing with respect to the time of occurrence of the combustion changeover request when the changeover direction is the first direction from the homogeneous combustion mode to the stratified combustion mode.

5. The engine control system as claimed in claim 1 wherein the controller monitors an engine operating condition of the engine, and determines a requested combustion mode in accordance with the engine operating condition, and the controller sets the EGR control mode to the stratifying EGR mode only when the requested combustion mode is the stratified combustion mode and simultaneously the combustion control mode is set to the stratified combustion mode, and otherwise sets the EGR control to the homogenizing EGR mode.

6. An engine control system comprising:
    an internal combustion engine having a combustion control system and an EGR system, the combustion control system controlling a combustion condition in the engine by changing over a combustion control mode between a stratified combustion mode and a homogeneous combustion mode, and the EGR system recirculating exhaust gas of the engine to an intake air flow to the engine; and
    a controller for controlling an EGR quantity by controlling the EGR system, for changing over an EGR control mode between a stratifying EGR mode for the stratified combustion mode and a homogenizing EGR mode for the homogeneous combustion mode to adapt the EGR quantity to the combustion condition of the engine, and for changing an EGR control changeover timing of changeover of the EGR control mode between the stratifying mode and the homogenizing mode in accordance with a changeover direction which is one of a first direction from the homogeneous combustion mode to the stratified combustion mode and a second direction from the stratified combustion mode to the homogeneous combustion mode; and
    an engine operating condition sensor, the sensor sensing an engine operating condition of the engine,
    wherein the EGR system of the engine includes
        an EGR passage extending from an exhaust system of the engine to an intake system of the engine, and
        an EGR valve disposed in the EGR passage, wherein the controller produces an EGR control signal to control an opening degree of the EGR valve to control the EGR quantity in one of the stratifying EGR mode and the homogenizing EGR mode, and wherein the controller determines the changeover direction by selecting, as a desired target combustion mode, one of the stratified combustion mode and the homogeneous combustion mode in accordance with the engine operating condition sensed by the sensor, advances the EGR control changeover timing to effect a start of a changeover of the EGR mode and the homogenizing EGR mode in advance of a changeover of the combustion mode and the homogeneous combustion mode when the target combustion mode is the homogeneous combustion mode and the changeover direction is from the stratified combustion mode to the homogeneous combustion mode, and retards the EGR control changeover timing to delay a start of the changeover of the EGR control mode until the changeover of the combustion control mode when the target combustion mode is the stratified combustion mode and the changeover direction is from the homogeneous combustion mode to the stratified combustion mode.

7. The engine control system according to claim 6 wherein the stratifying EGR mode is a mode for increasing the EGR quantity by increasing an opening of the EGR valve, the homogenizing EGR mode is a mode for decreasing the EGR quantity by decreasing the opening of the EGR valve, and the controller holds the EGR control mode in the homogenizing mode during a transient interval from a target changeover time of changeover of the target combustion mode from one of the stratified combustion mode and the homogeneous combustion mode to the other of the stratified combustion mode and the homogeneous combustion mode, to a combustion changeover time of actual changeover of the combustion control mode from one of the stratified combustion mode and the homogeneous combustion mode to the other of the stratified combustion mode and the homogeneous combustion mode in response to the changeover of the target combustion mode both when the changeover direction is from the homogeneous combustion mode to the stratified combustion mode and when the changeover direction is from the stratified combustion mode to the homogeneous combustion mode.

8. The engine control system according to claim 7 wherein the controller carries to carry out a changeover of the EGR control mode from the stratifying mode to the homogenizing mode by changing over a desired target EGR quantity from a first level according to the stratifying mode to a second level according to the homogenizing mode immediately when the engine operating condition varies from a first condition region requiring the stratified combustion mode to a second condition region requiring the homogeneous combustion mode, and to carry out a changeover of the EGR control mode from the homogenizing mode to the stratifying mode by changing over the desired target EGR quantity from the second level to the first level when the combustion control mode is changed over from the homogeneous combustion mode to the stratified combustion mode.

9. The engine control system according to claim 8 wherein the controller produces to produce a condition signal which is in a first signal state when the target combustion control mode and the actual combustion control mode are both the stratified combustion mode, in a second signal state when the target combustion control mode and the actual combustion control mode are both the homogeneous combustion mode, and in a third signal state when the target combustion control mode and the actual combustion control mode are different from each other, and sets the EGR control mode to the stratifying mode only when the condition signal is in the first signal state, and to the homogenizing mode both when the condition signal is in the second signal state and when the condition signal is in the third signal state.

10. The engine control system according to claim 9 wherein the homogeneous combustion mode comprises a rich combustion mode for controlling an air fuel ratio at a rich level and a lean combustion mode for controlling the air fuel ratio at a lean level leaner than the rich level, the homogenizing EGR mode comprises a first mode suitable for the lean combustion mode and a second mode suitable for the rich combustion mode, and the controller selects, as the target combustion mode, one of the stratified combustion mode, the lean combustion mode of the homogeneous combustion mode and the rich combustion mode of the homogeneous combustion mode and to adapt the EGR quantity of the engine to the combustion condition of the engine by changing over the EGR control mode among the stratifying mode, the first mode and the second mode.

11. The engine control system according to claim 10 wherein the controller allows a delay of changeover of the EGR control mode to the second mode after an actual changeover of the combustion control mode to the rich combustion mode.

12. The engine control system according to claim 11 wherein the combustion control system of the engine comprises a fuel control actuator for varying a fuel supply quantity to the engine to control an actual air fuel ratio to a desired target air fuel ratio, and the controller effects a changeover of the EGR control mode from the second mode of the homogenizing mode to the stratifying EGR mode by decreasing the target EGR quantity from a rich homogenizing value to a lean homogenizing value in response to a request of changeover of the combustion control mode from the rich combustion mode to the lean combustion mode, and then increasing the target EGR quantity from the lean homogenizing value to an ultra lean stratifying value at or after a time of actual changeover of the combustion control mode from the homogeneous combustion mode to the stratified combustion mode, and effects a changeover of the EGR control mode from the stratifying mode to the second mode of the homogenizing mode by decreasing the target EGR quantity from the stratifying value to the lean homogenizing value in response to a request for a changeover of the combustion control mode from the stratified mode to the homogeneous mode, and then increasing the target EGR quantity from the lean homogenizing value to the rich homogenizing value when the target air fuel ratio enters a predetermined rich region richer than a predetermined level.

13. The engine control system according to claim 8
wherein the combustion control system of the engine comprises a fuel injection system which comprises a fuel injector for injecting fuel directly into an engine cylinder of the engine;

wherein the controller comprises a first section for changing over the combustion control mode between the stratified combustion mode and the homogeneous combustion mode by changing over a fuel injection timing between a first injection timing for the stratified combustion mode and a second injection timing for the homogeneous combustion mode, and a second section for changing over the EGR control mode between the stratifying mode and the homogenizing mode;

wherein the controller comprises a computer system comprising at least one central processing unit; and wherein the engine operating condition sensor comprises at least one of an engine load sensor for sensing an engine operating condition indicative of an engine load, and an engine speed sensor for sensing an engine operating condition indicative of an engine speed.

14. An engine control process for an internal combustion engine comprising a combustion control system for controlling a combustion condition in the engine by changing over a combustion control mode between a stratified combustion mode and a homogeneous combustion mode, and an EGR system for recirculating exhaust gas of the engine to an intake air flow into the engine; the engine control process comprising:

controlling an EGR quantity of the engine to adapt the EGR quantity to the combustion condition of the engine by changing over an EGR control mode between a stratifying EGR mode for the stratified combustion mode and a homogenizing EGR mode for the homogeneous combustion mode; and changing an EGR control changeover timing of changeover of the EGR control mode between the stratifying EGR mode and the homogenizing EGR mode in accordance with a changeover direction which is one of a first direction from the homogeneous combustion mode to the stratified combustion mode and a second direction from the stratified combustion mode to the homogeneous combustion mode, the EGR control changeover timing being advanced to effect a start of a changeover of the EGR control mode in advance of a changeover of the combustion control mode when the changeover direction is the second direction from the stratified combustion mode to the homogeneous combustion mode.

15. The engine control process according to claim 14 wherein the controlling step comprises a control signal producing step of producing an EGR control signal, in one of the stratifying EGR mode a nd the homogenizing EGR mode, to control an opening degree of an EGR valve disposed in an EGR passage extending from an exhaust system of the engine to an intake system of the engine, for controlling the EGR quantity of the engine.

16. An engine control process for an internal combustion engine having a combustion control system and an EGR system, the combustion control system controlling a combustion condition in the engine by changing over a combustion control mode between a stratified combustion mode and a homogeneous combustion mode, and the EGR system recirculating exhaust gas of the engine to an intake air flow into the engine, the engine control process comprising:

controlling an EGR quantity of the engine to adapt the EGR quantity to the combustion condition of the engine by changing over an EGR control mode between a stratifying EGR mode for the stratified combustion mode and a homogenizing EGR mode for the homogeneous combustion mode; and changing an EGR control changeover timing of changeover of the EGR control mode between the stratifying EGR mode and the homogenizing EGR mode in accordance with a changeover direction which is one of a first direction from the homogeneous combustion mode to the stratified combustion mode and a second direction from the stratified combustion mode to the homogeneous combustion mode, wherein the controlling step includes producing an EGR control signal, in one of the stratifying EGR mode and the homogenizing EGR mode, to control an opening degree of an EGR valve disposed in an EGR passage extending from an exhaust system of the engine to an intake system of the engine, to control the EGR quantity of the engine, wherein the changing step includes collecting input information on a sensed engine operating condition;

determining the changeover direction by selecting, as a desired target combustion mode, one of the stratified combustion mode and the homogeneous combustion mode in accordance with the engine operating condition; and advancing the EGR control changeover timing to effect a start of a changeover of the EGR control mode between the stratifying EGR mode and the homogenizing EGR mode in advance of a changeover of the combustion control mode between the stratified combustion mode and the homogeneous combustion mode when the target combustion mode is the homogeneous combustion mode and the changeover direction is from the stratified combustion mode to the homogeneous combustion mode, and retarding the EGR control changeover timing to delay a start of the changeover of the EGR control mode until the changeover of the combustion control mode when the target combustion mode is the stratified combustion mode and the changeover direction is from the homogeneous combustion mode to the stratified combustion mode.

17. The engine control process according to claim 16 wherein the stratifying EGR mode is a mode for increasing the EGR quantity in the engine by increasing an opening of the EGR valve, the homogenizing EGR mode is a mode for decreasing the EGR quantity by decreasing the opening of the EGR valve, and the EGR control mode is held in the homogenizing mode during a transient interval from a target changeover time of changeover of the target combustion mode from one of the stratified combustion mode and the homogeneous combustion mode to the other of the stratified combustion mode and the homogeneous combustion mode, to a combustion change over time of actual changeover of the combustion control mode from one of the stratified combustion mode and the homogeneous combustion mode to the other of the stratified combustion mode and the homogeneous combustion mode in response to the changeover of the target combustion mode both when the changeover direction is from the homogeneous combustion mode to the stratified combustion mode and when the changeover direction is from the stratified combustion mode to the homogeneous combustion mode.

18. The engine control process according to claim 17:

wherein a changeover of the EGR control mode from the stratifying mode to the homogenizing mode is carried out by changing over a desired target EGR quantity from a first level according to the stratifying mode to a second level according to the homogenizing mode immediately when the engine operating condition varies from a first condition region requiring the stratified combustion mode to a second condition region requiring the homogeneous combustion mode, and a changeover of the EGR control mode from the homogenizing mode to the stratifying mode is carried out by changing over the desired target EGR quantity from the second level to the first level when the combustion control mode is changed over from the homogeneous combustion mode to the stratified combustion mode;

wherein the selecting comprises a step of producing a condition signal which is in a first signal state when the target combustion control mode and the actual combustion control mode are both the stratified combustion mode, in a second signal state when the target combustion control mode and the actual combustion control mode are both the homogeneous combustion mode, and in a third signal state when the target combustion control mode and the actual combustion control mode are different from each other, and the controlling step comprises a step of setting the EGR control mode to the stratifying mode only when the condition signal is in the first signal state.

19. The engine control process according to claim 18:

wherein the homogeneous combustion mode comprises a rich combustion mode for controlling an air fuel ratio at a rich level and a lean combustion mode for controlling the air fuel ratio at a lean level leaner than the rich level, the homogenizing EGR mode comprises a first EGR mode suitable for the lean combustion mode and a second EGR mode suitable for the rich combustion mode, and the selecting step comprises an operation of selecting, as the target combustion mode, one of the stratified combustion mode, the lean combustion mode of the homogeneous combustion mode and the rich combustion mode of the homogeneous combustion mode, to adapt the EGR quantity of the engine to the combustion condition of the engine by changing over the EGR control mode among the stratifying EGR mode, the first EGR mode and the second EGR mode;

wherein the discriminating step is arranged to allow a delay of changeover of the EGR control mode to the second EGR mode after an actual changeover of the combustion control mode to the rich combustion mode; and wherein the discriminating step comprises a step of examining a parameter indicative of an air fuel ratio of the engine, and causing the EGR control mode to be changed over to effect a changeover of the EGR control mode from the second EGR mode of the homogenizing mode to the stratifying EGR mode by decreasing the target EGR quantity from a second homogenizing value to a first homogenizing value smaller than the second homogenizing value in response to a request of changeover of the combustion control mode from the rich combustion mode to the lean combustion mode of the homogenizing mode, and then increasing the target EGR quantity from the first homogenizing value to a stratifying value greater than the second homogenizing value at or after a time of actual changeover of the combustion control mode from the homogeneous combustion mode to the stratified combustion mode, and effects a changeover of the EGR control mode from the stratifying EGR mode to the second EGR mode of the homogenizing mode by decreasing the target EGR quantity from the stratifying value to the first homogenizing value in response to a request for a changeover of the combustion control mode from the stratified mode to the homogeneous mode, and then increasing the target EGR quantity from the first homogenizing value to the second homogenizing value when the parameter indicative of the air fuel ratio enters a predetermined rich region richer than a predetermined level.

20. An engine control system comprising:
an internal combustion engine comprising at least one engine cylinder;

a fuel injection system for controlling a combustion condition in the engine by injecting fuel into the engine in response to a combustion control signal which is in one of a first combustion control state for controlling the combustion condition in a stratified combustion mode and a second combustion control state for controlling the combustion condition in a homogeneous combustion mode;

an EGR system comprising an EGR passage for recirculating exhaust gas of the engine into an intake air flow, and an EGR valve disposed in the EGR passage, for controlling an EGR quantity of the EGR system in response to an EGR control signal which is in one of a first EGR control state for controlling the EGR quantity in a first EGR mode adapted to the stratified combustion mode, and a second EGR control state for controlling the EGR quantity in a second EGR mode adapted to the homogeneous combustion mode;

a sensor for collecting input information to determine an engine operating parameter indicative of an engine load by sensing a first engine operating condition; and a controller for controlling the combustion condition and the EGR quantity by producing the combustion control signal and the EGR control signal in accordance with the engine operating parameter, the controller being connected with the sensor and configured to produce a condition signal which is in a first condition state when the engine operating parameter is in a predetermined lower engine load region and in a second condition state when the engine operating parameter is in a predetermined higher load region, the controller being further connected with the fuel injection system and configured to change over the combustion control signal between the first and second combustion control states so that the combustion control signal is in the first combustion control state when the condition signal is in the first condition state, and in the second combustion control state when the condition signal is in the second condition state, and the controller being further connected with the EGR system and configured to effect a changeover of the EGR control signal from the first EGR control state to the second EGR control state in response to a changeover of the condition signal from the first condition state to the second condition state before a changeover of the combustion control signal from the first combustion control state to the second combustion control state, and to effect a changeover of the EGR control signal from the second EGR control state to the first EGR control state in response to a changeover of the combustion control signal from the second combustion control state to the first combustion control state with a delay after a changeover of the condition signal from the second condition state to the first condition state.

21. The engine control system according to claim 20 wherein the controller holds the EGR control signal in the second EGR condition state during a transient interval from a changeover of the condition signal to a responsive changeover of the combustion control signal responsive to the changeover of the condition signal both when the changeover of the condition signal is from the second condition state to the first condition state and when the changeover of the condition signal is from the first condition state to the second condition state.

* * * * *